(12) United States Patent
Schubert et al.

(10) Patent No.: US 10,249,406 B2
(45) Date of Patent: Apr. 2, 2019

(54) CABLE HARNESS

(71) Applicant: Robert Bosch GmbH, Stuttgart (DE)

(72) Inventors: Gerhard Schubert, Strullendorf (DE); Heiko Klaumuenzer, Bamberg (DE); Jochen Zipfel, Schesslitz (DE); Laura Bauer, Altendorf (DE); Timo Kegel, Memmelsdorf (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 15/729,887

(22) Filed: Oct. 11, 2017

(65) Prior Publication Data

US 2018/0108453 A1 Apr. 19, 2018

(30) Foreign Application Priority Data

Oct. 13, 2016 (DE) .................. 10 2016 219 999

(51) Int. Cl.
| | | |
|---|---|---|
| *H01B 7/00* | (2006.01) | |
| *H01M 10/42* | (2006.01) | |
| *H01M 10/48* | (2006.01) | |
| *H01M 2/10* | (2006.01) | |
| *H01M 2/20* | (2006.01) | |
| *H02G 3/00* | (2006.01) | |
| *B60R 16/02* | (2006.01) | |
| *H02G 3/04* | (2006.01) | |
| *H02G 3/30* | (2006.01) | |

(52) U.S. Cl.
CPC ........ *H01B 7/0045* (2013.01); *H01M 10/425* (2013.01); *H01M 10/482* (2013.01); *B60R 16/0207* (2013.01); *H01M 2/1083* (2013.01); *H01M 2/206* (2013.01); *H01M 2220/20* (2013.01); *H02G 3/00* (2013.01); *H02G 3/04* (2013.01); *H02G 3/305* (2013.01)

(58) Field of Classification Search
CPC .......... H02G 3/185; H02G 3/088; H02G 3/00; H01B 7/0045; H01M 10/425; H01M 2/206
See application file for complete search history.

(56) References Cited

U.S. PATENT DOCUMENTS

| 3,898,371 A | * | 8/1975 | Bridgett | ............... | H01B 7/0846 |
| | | | | | 174/72 A |
| 3,984,622 A | * | 10/1976 | Ross | .................... | H01B 7/0045 |
| | | | | | 174/72 A |

(Continued)

FOREIGN PATENT DOCUMENTS

| DE | 19746526 | 4/1999 |
| DE | 10225474 | 12/2003 |

(Continued)

*Primary Examiner* — Dhiru R Patel
(74) *Attorney, Agent, or Firm* — Michael Best & Friedrich LLP

(57) ABSTRACT

A cable harness (10) includes a plurality of electrical conductors (12) for the contacting of battery cells of a battery module as well as a film-shaped carrier element (14). The electrical conductors (12) are arranged for at least a portion in parallel with each other on the carrier element (14) and are joined to the carrier element (14). A flexible elongated hollow body (16) is arranged in parallel for at least a portion with at least one of the electrical conductors (12) and is joined to the carrier element (14). A battery module has a plurality of battery cells and at least one cable harness (10).

10 Claims, 4 Drawing Sheets

(56) References Cited

U.S. PATENT DOCUMENTS

| | | | | |
|---|---|---|---|---|
| 3,984,662 | A * | 10/1976 | Sorenson | G07C 3/00 |
| | | | | 365/219 |
| 4,017,772 | A * | 4/1977 | Burnside | B60Q 1/38 |
| | | | | 174/72 A |
| 4,611,656 | A | 9/1986 | Kendall, Jr. et al. | |
| 5,871,858 | A * | 2/1999 | Thomsen | B60R 25/04 |
| | | | | 327/403 |
| 7,511,226 | B2 * | 3/2009 | Fahey | H02G 3/00 |
| | | | | 174/135 |
| 7,966,724 | B2 * | 6/2011 | Dodwell | B29C 39/021 |
| | | | | 174/650 |
| 8,794,563 | B2 * | 8/2014 | Lai | B65H 75/4449 |
| | | | | 174/47 |
| 10,020,549 | B2 * | 7/2018 | Lee | H01M 10/625 |
| 2006/0237219 | A1 | 10/2006 | Glew | |
| 2014/0370343 | A1 | 12/2014 | Nomoto et al. | |

FOREIGN PATENT DOCUMENTS

| | | |
|---|---|---|
| DE | 102005033185 A1 | 1/2007 |
| DE | 112013005121 | 8/2015 |
| JP | 2016076433 A | 5/2016 |

* cited by examiner

CABLE HARNESS

BACKGROUND OF THE INVENTION

The invention concerns a cable harness, comprising a plurality of electrical conductors for the contacting of battery cells of a battery module as well as a film-shaped carrier element, and wherein the electrical conductors are arranged for at least a portion in parallel with each other on the carrier element and are joined to the carrier element.

For high-power battery systems, such as for use in electric vehicles (EV), hybrid vehicles (HEV), plug-in hybrid vehicles (PHEV), as well as in stationary accumulators, individual battery cells are electrically connected by means of a series circuit as well as a parallel circuit into battery modules with a desired overall power. The battery cells of a battery module in this case each have a positive terminal and a negative terminal.

In order to be able to monitor the individual battery cells of a battery module by a battery control unit (BCU), a voltage of each battery cell is measured, and on at least some of the battery cells the temperature is measured by a locally arranged temperature sensor. Optionally, current sensors are also provided to measure the currents of the battery cells.

The terminals of the battery cells as well as the temperature sensors and the current sensors are electrically connected to the battery control unit. For this, cable harnesses are provided in particular, having a required number of electrical conductors. The electrical conductors of such a cable harness are arranged for example on a film-shaped carrier element and joined to the carrier element, for example by adhesive.

Ribbon cables are known for the connection of electronic devices, especially by means of a bus system, being used inter alia in computers and other EDP devices. Such a ribbon cable comprises a plurality of parallel wires which are surrounded by an insulating material.

Document DE 11 2013 005 121 T5 discloses a flexible printed circuit with bus lines for a battery system. The printed circuit has a flexible circuit board, on which the electrical lines are printed. The lines serve for connecting temperature sensors, as well as measuring the voltages of the battery cells. All the lines of the flexible circuit board are connected to a chip, which is provided for the measuring of voltage and temperature.

Document DE 102 25 474 A1 discloses a support plate with several different lines. The support plate is intended in particular for use in a motor vehicle. It is explicitly provided that various lines are arranged on the support plate, especially electrical and optical lines. The lines are arranged next to each other on a flat carrier film. On the side of the conductors opposite the carrier film there is arranged an additional cover layer. During the manufacturing, at first the conductors are laminated on the carrier film and then the cover layer is applied.

Document DE 197 46 526 A1 discloses a cable harness for a vehicle. The cable harness comprises a plurality of parallel running lines, which are surrounded by a film. The cable harness may be flat in configuration and has a low installed height. For the making of the cable harness, the lines are laid on a film, and then the film is turned over and laid over the lines. Thus, the film is placed on the lines from several sides, so that the lines are then surrounded by the film.

SUMMARY OF THE INVENTION

A cable harness is proposed, comprising a plurality of electrical conductors for the contacting of battery cells of a battery module as well as a film-shaped carrier element. The electrical conductors of the cable harness are arranged for at least a portion in parallel with each other on the carrier element of the cable harness and are joined to the carrier element.

According to the invention, a flexible elongated hollow body, especially a hose, is arranged in parallel for at least a portion with at least one of the electrical conductors of the cable harness and is mechanically joined to the carrier element of the cable harness.

According to one advantageous embodiment of the invention, the at least one hollow body of the cable harness is designed as a hydraulic hose. For example, the hollow body designed as a hydraulic hose serves as a conduit for cooling liquid.

According to one advantageous embodiment of the invention, the at least one hollow body of the cable harness is designed as a pneumatic hose. For example, the hollow body designed as a pneumatic hose serves as a conduit for a gas, especially for cooling.

According to one advantageous modification of the invention, several of the electrical conductors of the cable harness have cross sections of different size from one another. For example, conductors which are connected to a terminal of a battery cell have a larger cross section than conductors which are connected to a sensor.

Preferably, a reinforcing element is arranged in parallel with the carrier element of the cable harness. The reinforcing element increases the mechanical stability of the cable harness.

Advantageously, the electrical conductors of the cable harness as well as the at least one hollow body of the cable harness are arranged between the carrier element of the cable harness and the reinforcing element of the cable harness. In this way, the electrical conductors as well as the at least one hollow body are surrounded by the carrier element and the reinforcing element and thus protected against external influences.

According to one advantageous modification of the invention, the carrier element of the cable harness comprises at least one bend. Said bend is right-angled in particular, so that the electrical conductors of the cable harness as well as the at least one hollow body of the cable harness after the bend run in a direction which is oriented at right angles to a direction in which the electrical conductors of the cable harness as well as the at least one hollow body of the cable harness run before the bend. By means of the bend, the cable harness can be adapted flexibly to the local circumstances in a housing of the battery module, in particular, the cable harness can thus be led past obstructions.

A battery module is also proposed, comprising a plurality of battery cells and at least one cable harness according to the invention. The battery module also preferably comprises a battery control unit, and the battery control unit is electrically connected by means of the cable harness according to the invention to the battery cells as well as sensors of the battery module.

According to one advantageous embodiment of the invention, at least one of the plurality of electrical conductors of the cable harness is integrally bonded to a terminal of one of the plurality of battery cells of the battery module.

Preferably, the conductor is welded to the terminal, especially by means of laser welding.

A battery module according to the invention advantageously finds use in an electric vehicle (EV), in a hybrid vehicle (HEV), or in a plug-in hybrid vehicle (PHEV).

A cable harness according to the invention is relatively economical to produce. In particular, no wasting of the electrical conductors and the flexible elongated hollow body occurs during the manufacture, since these can be individually modified. Moreover, an exact and defined laying of the electrical conductors and of the flexible elongated hollow body is assured. Thanks to the relatively simple fabrication, low overhead costs also result. Moreover, the cross sections of the electrical conductors as well as those of the flexible elongated hollow body are individually adaptable.

Different feed variants can be realized by the fabrication with molds. If an electrical conductor or the flexible elongated hollow body is defective, it can be replaced. Thanks to the use of the flexible elongated hollow body further functions may be integrated into the cable harness, for example, the hollow body can serve as a conduit for pressurized air or a cooling liquid.

BRIEF DESCRIPTION OF THE DRAWINGS

Embodiments of the invention shall be explained more closely with the help of the drawings and the following description.

There are shown.

DETAILED DESCRIPTION

In the following description of embodiments of the invention, the same or similar elements are given the same reference numbers, and a repeated description of these elements is omitted in individual instances. The figures represent the subject matter of the invention only schematically.

Figure 1:
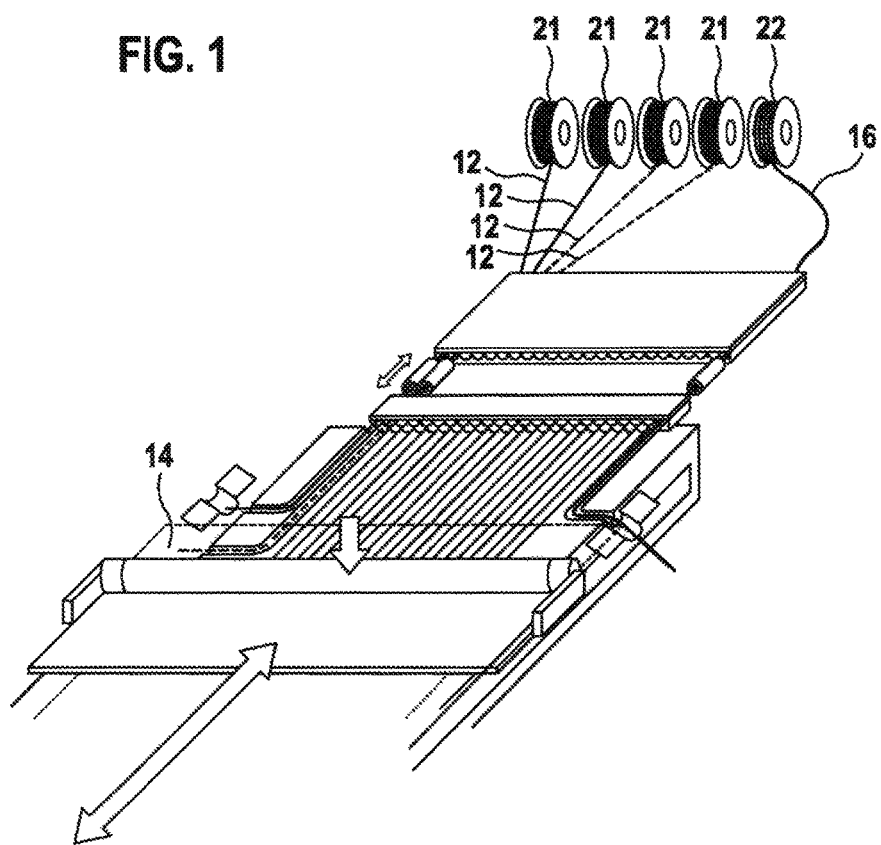
FIG. 1, a schematic representation of a process for the production of a cable harness, FIG. 2, a top view of a cable harness and a battery module, FIG. 3, top views of alternative variants of cable harnesses, FIG. 4, a cross section of a first embodiment of a cable harness, FIG. 5, a cross section of a second embodiment of a cable harness, and FIG. 6, a perspective representation of a cable harness.

FIG. 1 shows schematically a process for the fabrication of a cable harness 10. A machine not represented in more detail is outfitted with several rolls of wire 21 and a roll of hose 22. A electrical conductor 12 with an insulation is wound on each of the rolls of wire 21. A flexible elongated hollow body 16 in the form of a hose is wound on the roll of hose 22.

During the fabrication of the cable harness 10, the electrical conductors 12 and the elongated hollow body 16 are unwound in parallel with each other from the wire rolls 21 and the hose roll 22. A film-shaped carrier element 14 is placed on the electrical conductors 12 and the hollow body 16. The carrier element 14 is connected to the electrical conductors 12 and to the hollow body 16, especially by adhesive. The carrier element 14 serves in particular for stabilization of the cable harness 10 and for the arrangement of the electrical conductors 12 and the hollow body 16 relative to one another.

The electrical conductors 12 and the hollow body 16 in the cable harness 10 are then cut in appropriate places and thus separated from the rolls of wire 21 and the roll of hose 22. After this, the cable harness 10 so produced is installed in a battery module. In particular, the electrical conductors 12 which serve for the voltage measurement of battery cells of the battery module are placed on terminals of the battery cells and integrally bonded to them. In particular, the electrical conductors 12 are connected to the terminals of the battery cells by means of laser welding.

Figure 2:
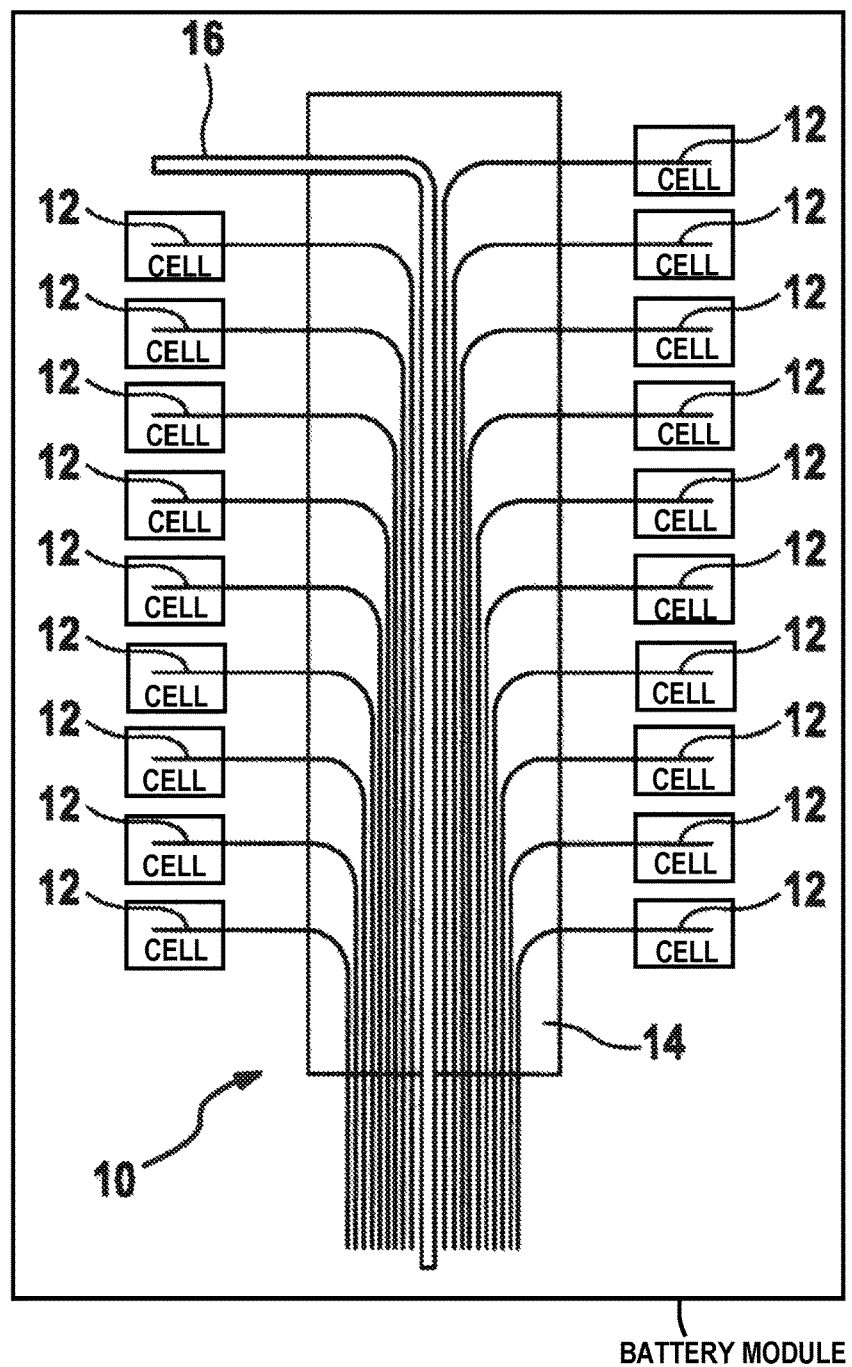

FIG. 2 shows a top view of a cable harness 10 which is made by means of a process as represented in FIG. 1. The cable harness 10 comprises a plurality of electrical conductors 12 which are arranged in parallel with each other for a portion on the carrier element 14. The flexible elongated hollow body 16 is also arranged in parallel with the electrical conductors 12 on the carrier element 14 and connected to the latter.

The electrical conductors 12 of the cable harness 10 serve, among other things, for the connection to terminals of battery cells of a battery module. Likewise, the electrical conductors 12 of the cable harness 10 may be connected to corresponding sensors which are arranged in or on the battery module. The flexible elongated hollow body 16, for example, is fashioned as a hydraulic hose and serves as a conduit for cooling liquid. Alternatively, the flexible elongated hollow body 16 can also be designed as a pneumatic hose and serves in this case as a conduit for pressurized air.

The cable harness 10 represented in FIG. 2 comprises a carrier element 14 with an approximately rectangular shaped basic form. The electrical conductors 12 and the hollow body 16 run for a portion in parallel with each other on the carrier element 14, then bend off at an approximate right angle at the side and leave the carrier element 14 at opposite sides.

Figure 3:
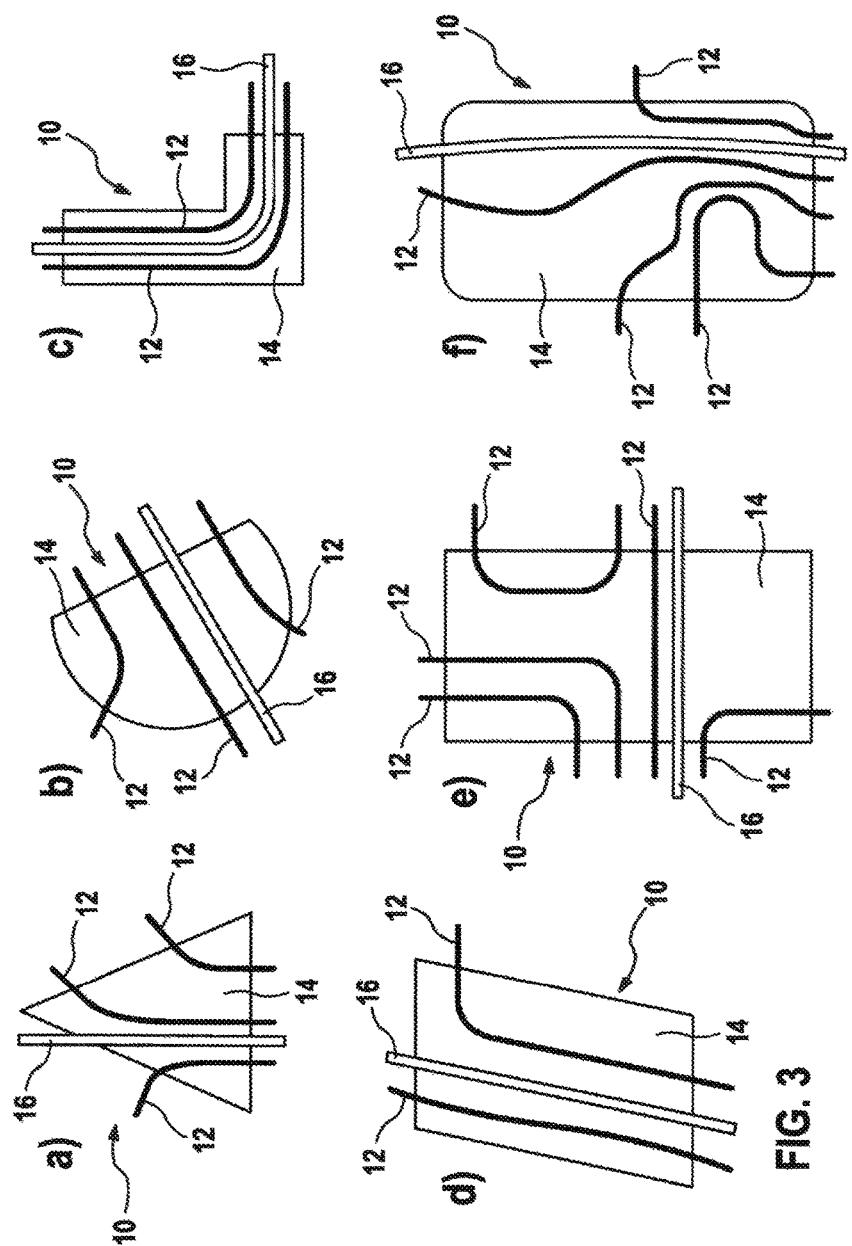

FIG. 3 shows top views of alternative variants of cable harnesses 10.

For example, FIG. 3a shows a cable harness 10 comprising a carrier element 14, having a triangular basic form. The electrical conductors 12 and the hollow body 16 run for a portion in parallel with each other on the carrier element 14 and then leave the carrier element 14 in various directions.

FIG. 3b shows a cable harness 10 whose carrier element 14 has an approximately semicircular basic form. In this case, the electrical conductors 12 and the hollow body 16 again run for a portion in parallel with each other on the carrier element 14 and then bend off in various directions.

FIG. 3c shows a cable harness 10 whose carrier element 14 has an L-shaped configuration. The electrical conductors 12 and the hollow body 16 again are arranged for a portion in parallel with each other on the carrier element 14 and run with an approximately right-angled bend along the L-shape of the carrier element 14.

FIG. 3d shows a cable harness 10 whose carrier element 14 has a rhomboidal basic form. The electrical conductors 12 and the hollow body 16 again run for a portion in parallel with each other on the carrier element 14 and leave the carrier element 14 in various locations.

FIG. 3e shows a cable harness 10 with an approximately rectangular carrier element 14. The electrical conductors 12 and the hollow body 16 run for a portion in parallel with each and leave the carrier element 14 on different sides.

FIG. 3f shows a cable harness 10 with a carrier element 14 having an approximately rectangular contour with rounded corners. Here again the electrical conductors 12 and the hollow body 16 run for a portion in parallel with each other and leave the carrier element 14 on different sides.

Figure 4:
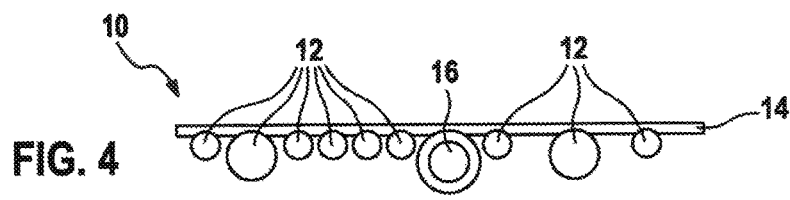

A cross section of a first embodiment of a cable harness 10 is shown in FIG. 4. On the carrier element 14 are arranged a plurality of electrical conductors 12 in parallel with each other and connected to the carrier element 14. The electrical conductors 12 shown have cross sections of different size.

The cross sections of the individual electrical conductors 12 are dimensioned according to the required current-carrying capacity.

A hollow body 16 is also arranged on the carrier element 14. The hollow body 16 runs in parallel with the electrical conductors 12 and is also connected to the carrier element 14.

Figure 5:
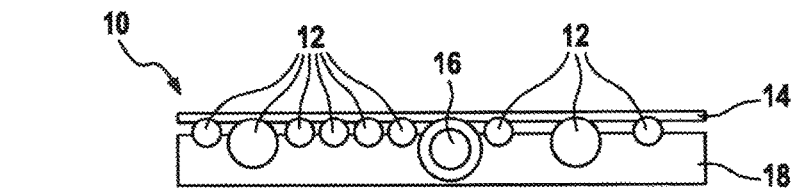

A cross section of a second embodiment of a cable harness 10 is shown in FIG. 5. The cable harness 10 according to the second embodiment comprises, like the cable harness 10 represented in FIG. 4, a carrier element 14, on which are arranged a plurality of electrical conductors 12 as well as a hollow body 16. At least one electrical conductor 12 has a larger cross section than the other electrical conductors 12. The hollow body 16 as well as the electrical conductors 12 once again run in parallel with each other and are connected to the carrier element 14.

The cable harness 10 according to the second embodiment moreover comprises a reinforcing element 18. The reinforcing element 18 in the present instance is likewise designed as a film-shaped element and lies in sheetlike fashion on the carrier element 14. The electrical conductors 12 and the hollow body 16 are arranged between the reinforcing element 18 and the carrier element 14. The thickness of the cable harness 10 in this case is dictated by the thickness of the hollow body 16. The thickness of the cable harness 10 is slightly larger than the thickness of the hollow body 16.

Figure 6:
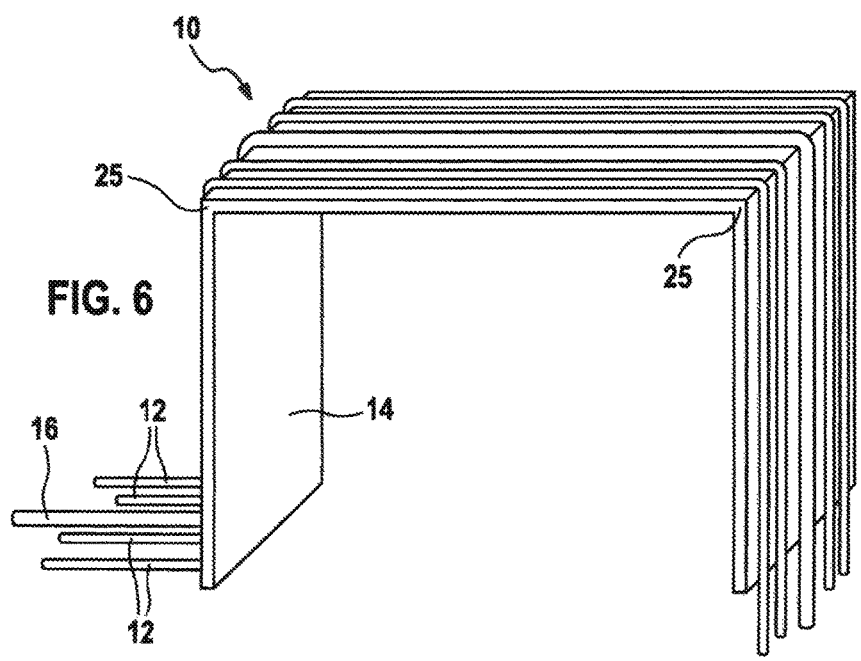

A perspective representation of a cable harness 10 is shown in FIG. 6. The cable harness 10, as already mentioned, comprises a carrier element 14, on which a plurality of electrical conductors 12 and a hollow body 16 are arranged. The carrier element 14 here has a plurality of bends 25, predominantly two, which each extend at an angle of around 90°. Thus, the cable harness 10 also has corresponding bends 25.

The electrical conductors 12 and the hollow body 16 are connected to the carrier element 14 and thus are likewise laid across the mentioned bends 25. The representation of the cable harness 10 shown here, which has a roughly U-shaped cross section, serves to get around obstacles situated inside the battery module and prevent a straight laying of the cable harness 10.

The invention is not confined to the sample embodiments described here and the aspects highlighted therein. Instead, a variety of modifications are possible within the realm indicated by the claims, falling within the scope of the skilled person's ability.

The invention claimed is:

1. A battery module comprising a plurality of battery cells and at least one cable harness (10), wherein the at least one cable harness (10) comprises a plurality of electrical conductors (12) for contacting the plurality of battery cells of the battery module as well as a film-shaped carrier element (14), wherein the electrical conductors (12) are arranged for at least a portion in parallel with each other on the carrier element (14) and are joined to the carrier element (14), characterized in that a flexible elongated hollow body (16) is arranged in parallel for at least a portion with at least one of the electrical conductors (12) and is joined to the carrier element (14), wherein at least one of the electrical conductors (12) of the cable harness (10) is integrally bonded to a terminal of a battery cell of the battery module.

2. The battery module according to claim 1, characterized in that the flexible elongated hollow body (16) is a hydraulic hose.

3. The battery module according to claim 1, characterized in that the flexible elongated hollow body (16) is a pneumatic hose.

4. The battery module according to claim 1, characterized in that a cross-section of a first one of the plurality of electrical conductors (12) is different from a cross-section of a second one of the plurality of electrical conductors (12).

5. The battery module according to claim 1, characterized in that a reinforcing element (18) is arranged in parallel with the carrier element (14).

6. The battery module according to claim 5, characterized in that the electrical conductors (12) as well as the flexible elongated hollow body (16) are arranged between the carrier element (14) and the reinforcing element (18).

7. The battery module according to claim 1, characterized in that the carrier element (14) comprises at least one bend (25).

8. A vehicle comprising the battery module according to claim 1.

9. The vehicle according to claim 8 wherein the vehicle is an electric vehicle (EV), a hybrid vehicle (HEV), or a plug-in hybrid vehicle (PHEV).

10. A cable harness (10), comprising a plurality of electrical conductors (12) for contacting battery cells of a battery module as well as a film-shaped carrier element (14), wherein the electrical conductors (12) are arranged for at least a portion in parallel with each other on the carrier element (14) and are joined to the carrier element (14), characterized in that a flexible elongated hollow body (16) is arranged in parallel for at least a portion with at least one of the electrical conductors (12) and is joined to the carrier element (14), wherein a reinforcing element (18) is arranged in parallel with the carrier element (14), and wherein the electrical conductors (12) as well as the flexible elongated hollow body (16) are arranged between the carrier element (14) and the reinforcing element (18).

* * * * *